G. A. WOODMAN.
CAR AXLE BEARING.
APPLICATION FILED MAY 28, 1908.

920,802.

Patented May 4, 1909.
2 SHEETS—SHEET 1.

Witnesses
R. A. White
M. A. Kiddie

Inventor
George A. Woodman
By W. H. Belt Atty

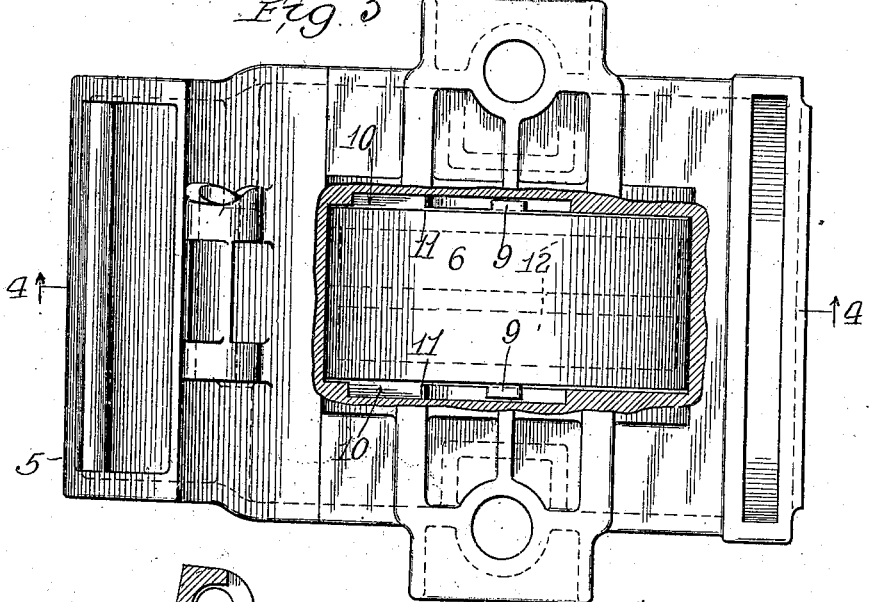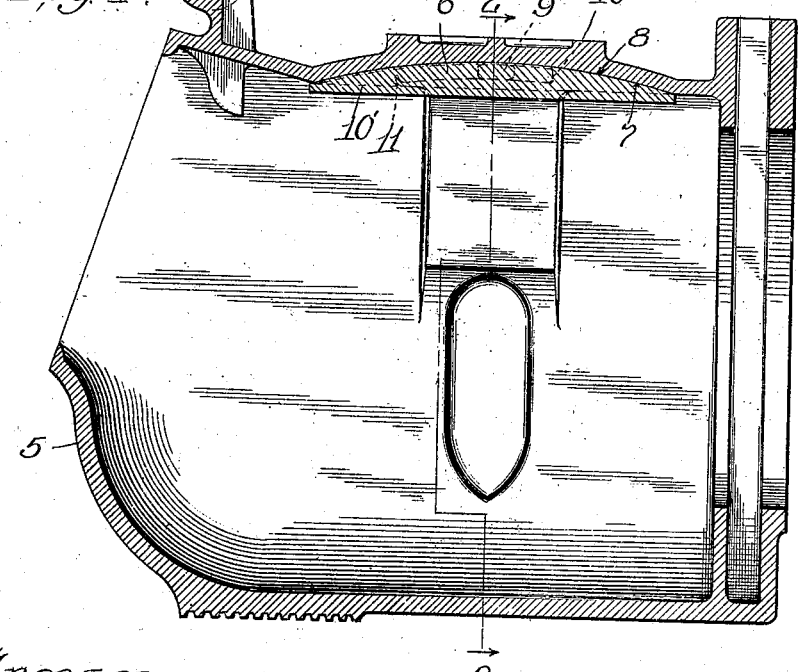

UNITED STATES PATENT OFFICE.

GEORGE ALVERADO WOODMAN, OF CHICAGO, ILLINOIS.

CAR-AXLE BEARING.

No. 920,802.  Specification of Letters Patent.  Patented May 4, 1909.

Application filed May 28, 1908. Serial No. 435,442.

*To all whom it may concern:*

Be it known that I, GEORGE A. WOODMAN, a citizen of the United States, residing at Chicago, in the county of Cook and State of Illinois, have invented new and useful Improvements in Car-Axle Bearings, of which the following is a specification.

This invention relates to improvements in bearings for car axles and its object is, broadly, to prevent the journal from wearing tapered and to adjust the brass and wedge to distribute the load evenly on the journal if it has worn tapered, whereby uneven wearing of the journal and a hot box is avoided.

The invention also has for its object to provide means, coöperative with a standard M. C. B. brass and wedge whereby a new brass and wedge will be adjusted to the surface of the journal longitudinally thereof. And a further object of the invention is to provide means forming a permanent part of the box for adjusting the brass and wedge properly to the surface of the journal, longitudinally thereof.

Figure 1:
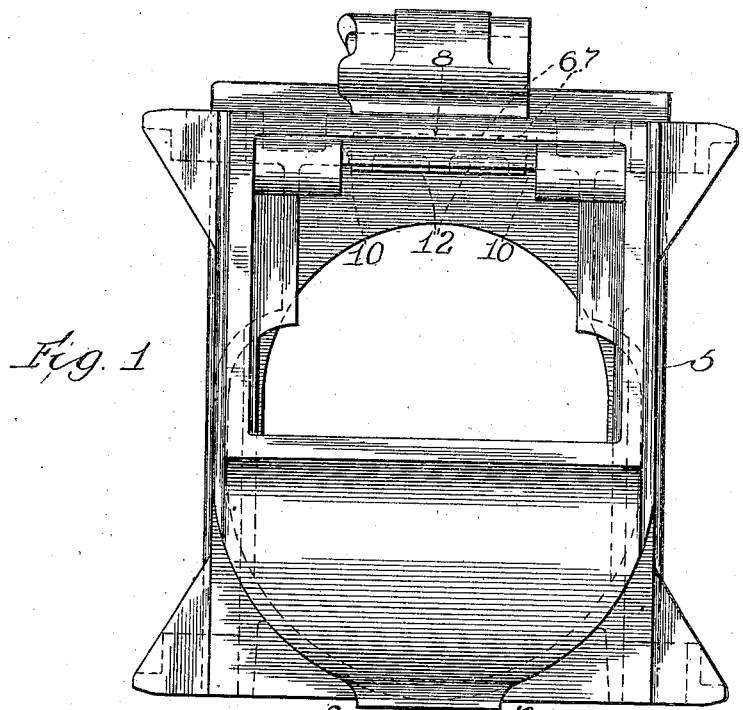
Figure 2:
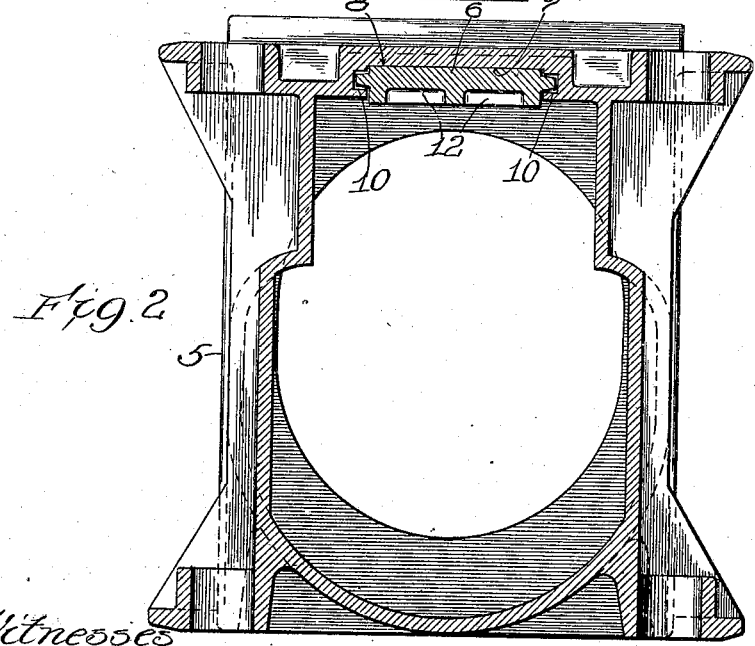

In the accompanying drawings Figure 1 is a front view of a journal box embodying my invention and with the lid removed. Fig. 2 is a sectional view on the line 2—2 of Fig. 4. Fig. 3 is a top view of the box partly broken away to show the sliding adjuster member. Fig. 4 is a sectional view on the line 4—4 of Fig. 3.

My invention can be embodied in any journal box to which it is adapted, the box 5 in the drawings being selected merely to illustrate the construction and application of the invention.

An oblong bearing adjuster member 6 is arranged in the top of the box 5 and has a convex top surface 7 which fits in the recess 8 in the underside of the top of the box. The top of the recess is complementary to the convex surface 7 of the adjuster member so that said member may slide lengthwise easily and freely in the recess. The adjuster member is provided at its sides with trunnions 9 which operate in grooves 10 in the side walls of the recess 8. The grooves 10 are open at one end 10' to permit the adjuster member to be arranged in place and after it is so arranged the feather edge 11 of each groove is struck up to form a stop and prevent said member from slipping out of the grooves. While this is a simple and convenient way of securing the adjuster member in its proper position in the box I do not limit myself thereto and may employ any other suitable means for that purpose. The other end 10" of the grooves is closed.

The lower surface of the adjuster member may be solid but to reduce the weight I prefer to make it of skeleton form with recesses 12 (Fig. 2.)

It is a common occurrence for a journal bearing to be worn "taper" by the brass, that is to say, of less diameter at one end, generally the inner end, than at the other. When a new brass is put on such a journal it may adjust itself in some way to the surface of the tapered journal, in which case the wear of the journal will continue uneven; but if the brass is held in its proper position the load will not be distributed evenly on the journal but only at its largest diameter. In either case the conditions are very unsatisfactory and frequently occasion a hot box.

My invention provides for maintaining the brass and the journal in parallelism when they are new or in good condition to prevent uneven wear of the parts, and it also provides for adjusting and maintaining the bearing in parallelism with the surface of a tapered journal to prevent further uneven wear; and in each case the invention provides for distributing the load evenly throughout the length of the journal. The flat top of an ordinary M. C. B. wedge will bear against the flat bottom of the adjuster member and when the weight of the car rests on the journal the adjuster member will slide lengthwise to a position which will hold the bearing in parallelism with the surface of the journal and in engagement with the journal throughout the length of the brass, whereby the load is evenly distributed on the journal.

I prefer to make the adjuster member and the recess oblong in shape with their contacting surfaces complementary to each other so that the adjuster member may readily move lengthwise of the box and the journal into proper position to form a solid bearing for the wedge. The guide grooves in the side walls of the recess are preferably curved on an arc concentric with the curvature of the concave surface of the recess and the convex surface of the adjuster member so that the trunnions may work easily therein as the member slides lengthwise.

What I claim and desire to secure by Letters Patent is:

1. The combination with a journal box having a recess in the underside of its top, the top of said recess being concave, of a device suspended in said recess and slidable lengthwise of the box to adjust the bearing to the journal, the top of said device being convex and complementary to the top of the recess, there being means on the device and box for securing said device to the top of the box.

2. The combination with a journal box having an oblong recess in the underside of its top, of an oblong device to work in said recess, the top of said recess being concave and the top of said device being convex and complementary to the top of the recess, said device being slidable lengthwise of the box, and means for guiding the device in its movement, there being means on the device and box for securing said device to the top of the box.

3. The combination with a journal box having a recess in the underside of its top, of a device constructed to slide in said recess lengthwise of the box, there being guide grooves in the side walls of said recess and trunnions on the sides of said device to work in said grooves.

4. The combination with a journal box having a concave recess in the underside of its top and curved guide grooves in the side walls of said recess, said grooves being closed at one end and open at the other and provided with feather edges at their open ends, and a device slidable lengthwise of the box in said recess and having a convex surface complementary to the concave surface of the recess and trunnions on said device to work in said grooves, the feather edges being struck up to secure the device in place.

GEORGE ALVERADO WOODMAN.

Witnesses:
WILLIAM L. HART,
F. L. MOWRY.